(12) United States Patent
Wang et al.

(10) Patent No.: US 12,412,259 B2
(45) Date of Patent: Sep. 9, 2025

(54) METHOD FOR MEASURING DISTANCE BETWEEN TRACE LINES OF THREE-DIMENSIONAL BRAIDED MATERIAL

(71) Applicant: NANJING UNIVERSITY OF AERONAUTICS AND ASTRONAUTICS, Nanjing (CN)

(72) Inventors: Jun Wang, Nanjing (CN); Zhongde Shan, Nanjing (CN); Dawei Li, Nanjing (CN); Li Dai, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 680 days.

(21) Appl. No.: 17/701,753

(22) Filed: Mar. 23, 2022

(65) Prior Publication Data

US 2022/0261983 A1 Aug. 18, 2022

(30) Foreign Application Priority Data

May 26, 2021 (CN) .......................... 202110576133.3

(51) Int. Cl.
*G06T 7/00* (2017.01)
*G06F 30/27* (2020.01)
(Continued)

(52) U.S. Cl.
CPC ............ *G06T 7/0004* (2013.01); *G06F 30/27* (2020.01); *G06T 7/73* (2017.01); *G06V 10/764* (2022.01);
(Continued)

(58) Field of Classification Search
CPC ..................... G06T 7/0004; G06T 7/73; G06T 2207/20081; G06T 2207/20084;
(Continued)

(56) References Cited

U.S. PATENT DOCUMENTS

2018/0168445 A1   6/2018   Horn

FOREIGN PATENT DOCUMENTS

CN        111127416 A  *  5/2020
CN        111932508 A     11/2020
(Continued)

OTHER PUBLICATIONS

"Shuo Meng et al. Woven Fabric Density Measurement by Using Multi-Scale Convolutional Neural Networks, 2019, IEEE Access, vol. 7, 75810-75821" (Year: 2019).*

(Continued)

*Primary Examiner* — Ming Y Hon
*Assistant Examiner* — Dominique James

(57) ABSTRACT

A method for measuring a distance between trace lines of a 3D braided material, including: (S1) establishing a vision data acquisition system using a vision sensor; (S2) acquiring, by the vision data acquisition system, a training data of the trace lines of the 3D braided material; (S3) constructing a deep learning model for recognizing the trace lines of the 3D braided material; and inputting the training data acquired in step (S2) to the deep learning model to obtain a trained deep learning model; and (S4) positioning a location of the trace lines of the 3D braided material in batch images according to the trained deep learning model obtained in step (S3); and measuring a distance between adjacent trace lines.

5 Claims, 2 Drawing Sheets

(51) Int. Cl.
- *G06T 7/73* (2017.01)
- *G06V 10/764* (2022.01)
- *G06V 10/77* (2022.01)
- *G06V 10/774* (2022.01)
- *G06V 10/80* (2022.01)
- *G06V 10/82* (2022.01)
- *G06V 20/64* (2022.01)
- *H04N 23/698* (2023.01)
- *H04N 23/90* (2023.01)

(52) U.S. Cl.
CPC ........ *G06V 10/7715* (2022.01); *G06V 10/774* (2022.01); *G06V 10/806* (2022.01); *G06V 10/82* (2022.01); *G06V 20/64* (2022.01); *H04N 23/698* (2023.01); *H04N 23/90* (2023.01); *G06T 2207/20081* (2013.01); *G06T 2207/20084* (2013.01); *G06T 2207/30124* (2013.01)

(58) Field of Classification Search
CPC . G06T 2207/30124; G06T 7/60; G06F 30/27; G06F 2119/02; G06F 30/20; G06F 30/15; G06F 30/17; G06V 10/764; G06V 10/7715; G06V 10/774; G06V 10/806; G06V 10/82; G06V 20/64; G06V 10/25; H04N 23/698; H04N 23/90
See application file for complete search history.

(56) References Cited

FOREIGN PATENT DOCUMENTS

| | | | |
|---|---|---|---|
| CN | 112102224 A | 12/2020 | |
| CN | 112465752 A | 3/2021 | |
| CN | 112697814 A | * 4/2021 | ........... G01N 21/952 |
| CN | 112815873 A | 5/2021 | |

OTHER PUBLICATIONS

"Schneider et al. Vision-Based On-Loom Measurement of Yarn Densities in Woven Fabrics, 2014, IEEE Transactions on Instrumentation and Measurement", vol. 64, 1063-1074 (Year: 2014).*

"Le et al. Novel Framework for Optical Film Defect Detection and Classification, 2020, IEEE Access, vol. 8, 60964-60978" (Year: 2020).*

"An et al. Fabric defect detection using deep learning: An Improved Faster R-approach, 2020, 2020 International Conference on Computer Vision, Image and Deep Learning (CVIDL), 319-324" (Year: 2020).*

"Wang et al. An Adaptive Corner Detection Method Based on Deep Learning, 2019, Chinese Control Conference (CCC), Guangzhou, China, 8478-8482" (Year: 2019).*

Byjus, "Distance between Two Parallel Lines Examples" published Aug. 12, 2020 (Year: 2020).*

Dawei Li. Automatic Vehicle Detection and Tracking in Aerial Images by Fixed-wing UAV,University of Chinese Academy of Sciences.2017,Chapter 4.2.

Kubo Liu. The Micro Structure and Mechanical Properties of 3D Woven Composites. Nanjing University of Aeronautics and Astronautics, 2007,Chapter 2.3-2.5.

Xiao Liang et al. Three-dimensional Path Planning for Unmanned Aerial Vehicles Based on Principles of Stream Avoiding Obstacles. Chinese Journal of Aeronautics and Astronautics, 2013, 34(7):1670-1681.

Yi-ming Xu et al.Wind Turbine Visual Inspection Based on GoogleNet Network in Transfer Learning Mode, Computer Science,2019,pp. 267-186.

* cited by examiner

METHOD FOR MEASURING DISTANCE BETWEEN TRACE LINES OF THREE-DIMENSIONAL BRAIDED MATERIAL

CROSS-REFERENCE TO RELATED APPLICATIONS

This application claims the benefit of priority from Chinese Patent Application No. 202110576133.3, filed on May 26, 2021. The content of the aforementioned application, including any intervening amendments thereto, is incorporated herein by reference.

TECHNICAL FIELD

This application relates to measurement of aero-engines, and more particularly to a method for measuring a distance between trace lines of a three-dimensional (3D) braided material.

BACKGROUND

The 3D braided composite material is generally employed as a reinforcement due to its superior spatial structural integrity. Compared to the traditional composites, in addition to the characteristics of light weight and high strength, the 3D braided composite also shows excellent impact resistance and high damage tolerance. In addition to the in-plane warp yarn and weft yarn, the 3D braided composite also has binding yarn running through layers along a thickness direction. Due to its structural characteristics, the 3D braided composite can overcome deficiencies of laminated composite materials, such as poor interlayer performance, and easy delamination and cracking.

In addition, according to the geometric size of the desired composite component, an irregular fabric with variable thickness and cross-section can be braided by the 3D braiding technology and adopted as a reinforcement, rendering the 3D braided composite have a good near-net shaping ability, and reducing the labor intensity and the secondary processing amount. In view of this, the 3D braided composite has attracted extensive attentions. Currently, the quality inspection of the 3D braided composite is difficult to perform due to the following restrictions. On one hand, it is difficult to control the deformation of the 3D braided material, and the injection time of resin is short. On the other hand, the flattened 3D braided material presents a complex and continuously-thickened curved surface, and corrugated yarn-reduction trace lines exist on both the front and back sides. The spacing between the trace lines will affect the performance of the 3D braided material, thus influencing the safety performance and service life of the 3D braided material. The manual measurement is cumbersome, time-consuming, and inefficient. Moreover, due to the limited effective working time and recognition accuracy of human eyes, many human errors will be introduced, failing to ensure the measurement efficiency and accuracy. Consequently, some uncontrollable factors may be brought for the subsequent processing, which will further affect the performance of the aero-engine. Considering the deficiencies of the manual measurement, an intelligent image processing method is developed, which can improve the measurement accuracy, reduce the labor intensity and lower the time consumption, facilitating enabling the efficient, intelligent, and convenient measurement.

SUMMARY

An object of this disclosure is to provide a method for measuring a distance between trace lines of a 3D braided material to overcome the deficiencies in the prior art.

The technical solutions of the disclosure are described below.

The disclosure provides a method for measuring a distance between trace lines of a 3D braided material, comprising:

(S1) establishing a vision data acquisition system using a vision sensor;

(S2) acquiring, by the vision data acquisition system, a training data of the trace lines of the 3D braided material;

(S3) constructing a deep learning model for recognizing the trace lines of the 3D braided material; and inputting the training data acquired in step (S2) to the deep learning model to obtain a trained deep learning model; and (S4) positioning the trace lines of the 3D braided material in batch images according to the trained deep learning model obtained in step (S3); and measuring a distance between adjacent trace lines.

In some embodiments, in step (S1), the vision data acquisition system comprises at least two visual sensors mounted on the same motion platform to realize panoramic visual data acquisition of a production region of the 3D braided material; observation fields of the at least two visual sensors are configured to enable 3600 coverage of an environmental information; and observation fields of adjacent visual sensors have an overlapping region.

In some embodiments, the vision data acquisition system further comprises a high-definition medium telephoto lens, a data storage device and a computation server;

the high-definition medium telephoto lens is configured to cooperate with the at least two visual sensors to complete data acquisition and determination of locations of the trace lines of the 3D braided material; and the at least two visual sensors are monitor cameras;

the data storage device is configured to store and manage data; and the computation server is configured to perform computation on the deep learning model for recognizing the trace lines of the 3D braided material.

In some embodiments, the vision sensor is a BASLER acA2440-20 gm industrial camera.

In some embodiments, in step (S3), the deep learning model is constructed through steps of:

(a) inputting an image of the 3D braided material;

(b) extracting feature maps from the image of the 3D braided material by using a set of conv-relu-pooling layers; wherein the feature maps are subsequently shared by a region proposal network (RPN) layer and a fully connected layer;

(c) extracting a candidate region; wherein the RPN layer is configured to generate region proposals; and the RPN layer determines whether anchors belong to foreground or background by Softmax, and modifies the anchors by bounding box regression to obtain accurate proposals;

(d) normalizing the candidate region; wherein the feature maps and proposals are collected by a RoI Pooling layer, and integrated to extract proposal feature maps to obtain features with a fixed dimension;

(e) performing classification and regression on the proposal feature maps; wherein the classification is performed by calculating a category of individual proposals using the proposal feature maps; and the bounding box regression is performed to obtain a precise final position of the trace lines of the 3D braided material; and (f) designing a function to calculate a distance between the trace lines of the 3D braided material positioned in step (e).

In some embodiments, in step (f), if two trace lines of the 3D braided material are respectively Ax+By+C1=0 and Ax+By+C2=0, a distance between the two trace lines is calculated as follows:

$$d = \frac{|C1 - C2|}{\sqrt{A^2 + B^2}}$$

The present disclosure has the following beneficial effects.

The method provided herein can automatically measure the distance between trace lines of the 3D braid material, reducing the interference caused by human errors, and improving the quality and reliability of the 3D braid material. Moreover, it can promote the intelligent manufacturing and measurement of the 3D braid material, and facilitate lowering the labor intensity.

DETAILED DESCRIPTION OF EMBODIMENTS

Technical solutions of the present disclosure will be described in detail below with reference to the accompanying drawings and embodiments.

Figure 1:
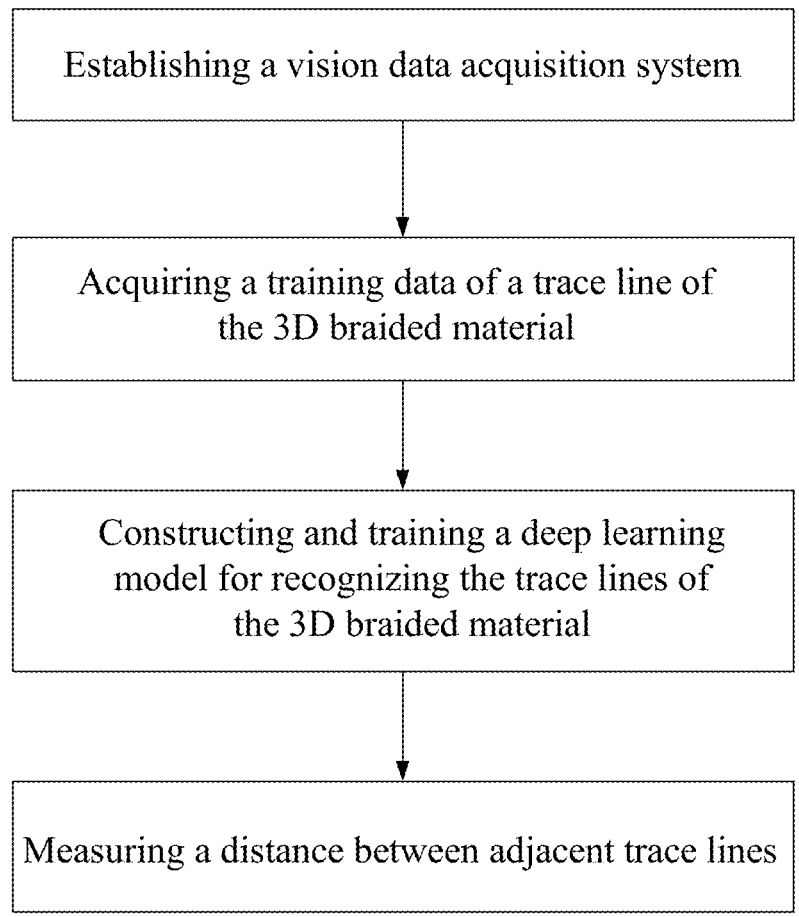
FIG. 1 is a flow chart of a method for measuring a distance between trace lines of a 3D braided material according to an embodiment of the present disclosure.

Referring to FIG. 1, a method for measuring a distance between trace lines of a 3D braided material is provided, which includes the following steps.

(S1) Establishment of a vision data acquisition system using a vision sensor

In this embodiment, a multi-vision sensor coordination method is adopted to acquire and analyze data. In a panoramic vision method based on the multi-vision sensor coordination, a motion platform is provided with at least two visual sensors to realize panoramic visual data acquisition of a production region of the 3D braided material. Observation fields of the at least two visual sensors are configured to enable 360° coverage of an environmental information, and observation fields of adjacent visual sensors have an overlapping region. The preferred data type is a general image format.

Figure 2:
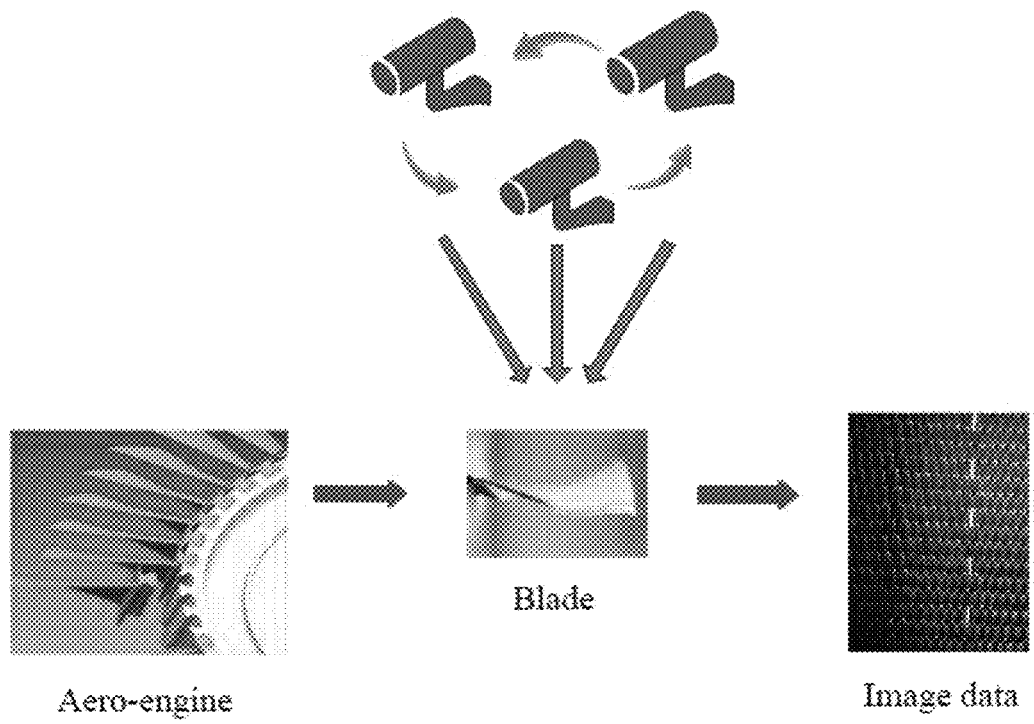
FIG. 2 is a structural diagram of a vision data acquisition system according to an embodiment of the present disclosure.

Referring to FIG. 2, the vision data acquisition system further includes a high-definition medium telephoto lens, a data storage device and a computation server.

The high-definition medium telephoto lens is configured to cooperate with the at least two visual sensors to complete data acquisition and determination of locations of the trace lines of the 3D braided fabric material. The at least two visual sensors are monitor cameras The data storage device is configured to store and manage data. For example, the data storage device includes optical disks, hard disks, flash disks and solid-state drives.

The computation server is configured to perform computation on the deep learning model for recognizing the trace lines of the 3D braided material.

(S2) Data acquisition

A training data of the trace lines of the 3D braided fabric is acquired by the vision data acquisition system.

(S3) Construction of a deep learning model for recognizing the trace lines of the 3D braided material The training data acquired in step (S2) is inputted to the deep learning model to obtain a trained deep learning model.

(S4) Measurement of the distance between the trace lines

The trace lines of the 3D braided material in batch images are positioned according to the trained deep learning model obtained in step (S3), then a distance between adjacent trace lines is measured.

In an embodiment, the vision sensor is a BASLER acA2440-20 gm industrial camera.

In an embodiment, in step (S3), the deep learning model is constructed through the following steps.

(a) An image of the 3D braided material is input.

(b) Extraction of feature maps

The feature maps are extracted from the image of the 3D braided material by using a set of conv-relu-pooling layers, and are subsequently shared by a sequent region proposal network (RPN) layer and a fully connected layer.

(c) Extraction of a candidate region

The RPN layer is configured to generate region proposals. The RPN layer determines whether anchors belong to foreground or background by Softmax, and modifies the anchors by bounding box regression to obtain accurate proposals.

(d) Normalization of the candidate region

The feature maps and proposals are collected by a RoI Pooling layer, and integrated to extract proposal feature maps to obtain features with a fixed dimension.

(e) Classification and regression

The classification is performed on the proposal feature maps by calculating a category of individual proposals using the proposal feature maps; and the regression is performed to obtain a precise final position of the trace lines of the 3D braided material.

(f) Distance calculation

A function is designed to calculate a distance between the trace lines of the 3D braided material positioned in step (e). If two trace lines of the 3D braided material are respectively Ax+By+C1=0 and Ax+By+C2=0, a distance between the two trace lines is calculated as follows:

$$d = \frac{|C1 - C2|}{\sqrt{A^2 + B^2}}.$$

If a distance between the trace lines of the 3D braided material reaches fixed standard, the 3D braided material is qualified.

Figure 3:
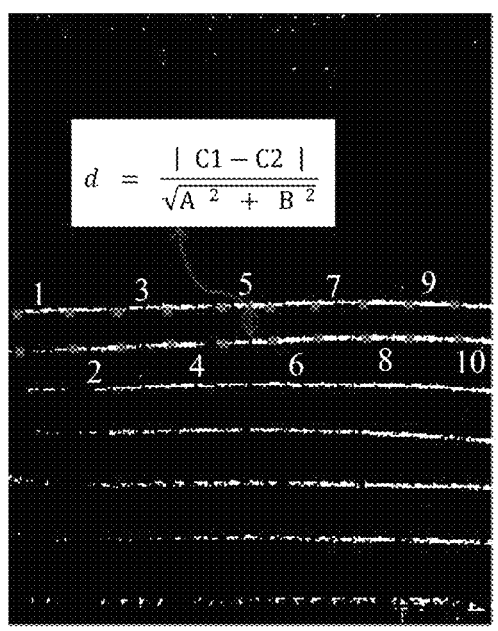
FIG. 3 illustrates a measurement process of the distance between trace lines of the 3D braided material according to an embodiment of the present disclosure.

Referring to FIG. 3, an embodiment of a method for measuring a distance between trace lines of a 3D braided material is illustrated. As shown in FIG. 3, a pair of trace lines the 3D braided fabric is isometrically divided into ten parts, and the distance between a pair of line segments on each part is calculated according to the straight-line distance formula. The measurement data is shown in Table 1.

TABLE 1

| Measurement results of the trace line spacing of the 3D braided fabric | | | | | | | | | | |
|---|---|---|---|---|---|---|---|---|---|---|
| Number | 1 | 2 | 3 | 4 | 5 | 6 | 7 | 8 | 9 | 10 |
| Spacing (cm) | 18.01 | 18.05 | 18.10 | 17.96 | 18.03 | 17.99 | 18.00 | 18.06 | 17.96 | 18.02 |

In conclusion, the method provided herein can automatically measure the distance between trace lines of the 3D braid material, reducing the interference caused by human errors, and improving the quality and reliability of the 3D braid material. Moreover, it can promote the intelligent manufacturing and measurement of the 3D braid material, and facilitate lowering the labor intensity.

It should be noted that these embodiments are only illustrative, and are not intended to limit the scope of production of the present disclosure. It should be understood that any modifications and changes made by those skilled in the art without departing from the spirit and scope of the disclosure shall fall within the scope of the present disclosure defined by the appended claims.

What is claimed is:

1. A method for measuring a distance between trace lines of a 3D braided material, comprising:
    (S1) establishing a vision data acquisition system using a vision sensor;
    (S2) acquiring, by the vision data acquisition system, a training data of the trace lines of the 3D braided material;
    (S3) constructing a deep learning model for recognizing the trace lines of the 3D braided material; and inputting the training data acquired in step (S2) to the deep learning model to obtain a trained deep learning model; and
    (S4) positioning the trace lines of the 3D braided material in batch images according to the trained deep learning model obtained in step (S3); and measuring a distance between adjacent trace lines; and
    in step (S3), the deep learning model is constructed through steps of:
    (a) inputting an image of the 3D braided material;
    (b) extracting feature maps from the image of the 3D braided material by using a set of conv-relu-pooling layers; wherein the feature maps are subsequently shared by a region proposal network (RPN) layer and a fully connection layer;
    (c) extracting a candidate region; wherein the RPN layer is configured to generate region proposals; and the RPN layer determines whether anchors belong to foreground or background by Softmax, and modifies the anchors by bounding box regression to obtain accurate proposals;
    (d) normalizing the candidate region; wherein the feature maps and proposals are collected by a RoI Pooling layer, and integrated to extract proposal feature maps to obtain features with a fixed dimension;
    (e) performing classification and regression on the proposal feature maps; wherein the classification is performed by calculating a category of individual proposals using the proposal feature maps; and the bounding box regression is performed to obtain a precise final position of the trace lines of the 3D braided material; and
    (f) designing a function to calculate a distance between the trace lines of the 3D braided material positioned in step (e).

2. The method of claim 1, wherein in step (S1), the vision data acquisition system comprises at least two visual sensors mounted on the same motion platform to realize panoramic visual data acquisition of a production region of the 3D braided material; observation fields of the at least two visual sensors are configured to enable 360° coverage of an environmental information; and observation fields of adjacent visual sensors have an overlapping region.

3. The method of claim 2, wherein the vision data acquisition system further comprises a high-definition medium telephoto lens, a data storage device and a computation server;
    the high-definition medium telephoto lens is configured to cooperate with the at least two visual sensors to complete data acquisition and determination of locations of the trace lines of the 3D braided material; and the at least two visual sensors are monitor cameras;
    the data storage device is configured to store and manage data; and
    the computation server is configured to perform computation on the deep learning model for recognizing the trace lines of the 3D braided material.

4. The method of claim 1, wherein the vision sensor is an industrial camera.

5. The method of claim 1, wherein in step (f), if two trace lines of the 3D braided material are respectively Ax+By+C1=0 and Ax+By+C2=0, a distance between the two trace lines is calculated as follows:

$$d = \frac{|C1 - C2|}{\sqrt{A^2 + B^2}}.$$

* * * * *